US007612301B2

(12) United States Patent
Arnold et al.

(10) Patent No.: US 7,612,301 B2

(45) Date of Patent: Nov. 3, 2009

(54) METHOD FOR WEIGHING AN AMBULANCE COT BY SUPPORTING IT ON A SCALE BY TWO WHEELS AND A KICKSTAND

(75) Inventors: Abe Arnold, Sabina, OH (US); William Harry Benedict, Jamestown, OH (US)

(73) Assignee: Ferno-Washington, Inc., Wilmington, OH (US)

( * ) Notice: Subject to any disclaimer, the term of this patent is extended or adjusted under 35 U.S.C. 154(b) by 32 days.

(21) Appl. No.: 12/062,563

(22) Filed: Apr. 4, 2008

(65) Prior Publication Data

US 2008/0209629 A1 Sep. 4, 2008

Related U.S. Application Data

(62) Division of application No. 11/331,841, filed on Jan. 13, 2006.

(51) Int. Cl.
*G01G 19/02* (2006.01)

(52) U.S. Cl. .......................................... 177/1; 177/144

(58) Field of Classification Search ..................... 177/1, 177/144

See application file for complete search history.

(56) References Cited

U.S. PATENT DOCUMENTS

| | | | | |
|---|---|---|---|---|
| 1,172,465 A | | 2/1916 | Knapp | |
| 3,644,944 A | | 2/1972 | Bourgraf et al. | |
| 3,732,938 A | * | 5/1973 | Nelson | 177/126 |
| 4,097,941 A | | 7/1978 | Merkel | |
| 4,192,541 A | | 3/1980 | Ferneau | |
| 4,767,148 A | | 8/1988 | Ferneau et al. | |
| 5,365,622 A | | 11/1994 | Schirmer | |
| 5,414,225 A | * | 5/1995 | Garfinkle | 177/199 |
| 5,448,022 A | * | 9/1995 | Rishel | 177/126 |
| 5,537,700 A | | 7/1996 | Way et al. | |
| 5,575,026 A | | 11/1996 | Way et al. | |
| 6,093,895 A | * | 7/2000 | Niosi | 177/136 |
| 6,389,623 B1 | | 5/2002 | Flynn et al. | |
| 6,712,375 B2 | | 3/2004 | Chao | |
| 6,735,794 B1 | | 5/2004 | Way et al. | |
| 6,971,465 B1 | | 12/2005 | Veara | |
| 7,199,311 B1 | * | 4/2007 | Buckner et al. | 177/144 |
| 2002/0093164 A1 | | 7/2002 | Tai | |
| 2003/0001360 A1 | | 1/2003 | Hotch | |
| 2005/0241063 A1 | | 11/2005 | Ferneau et al. | |
| 2006/0043689 A1 | | 3/2006 | Ostrow et al. | |

* cited by examiner

*Primary Examiner*—Randy W Gibson
(74) *Attorney, Agent, or Firm*—Dinsmore & Shohl LLP

(57) ABSTRACT

A method of weighing a patient on a platform scale comprising carrying the patient upon an ambulance cot having first and second pairs of wheels, and a kickstand having a lowered position and a raised position, wherein the kickstand in the lowered position lifts only the first pair of wheels of the ambulance cot in the air; and then supporting the ambulance cot on the platform scale with the second pair of wheels and said kickstand.

10 Claims, 4 Drawing Sheets

METHOD FOR WEIGHING AN AMBULANCE COT BY SUPPORTING IT ON A SCALE BY TWO WHEELS AND A KICKSTAND

CROSS REFERENCE TO RELATED APPLICATIONS

This application is a division of U.S. patent application Ser. No. 11/331,841 filed Jan. 13, 2006, of which the entire disclosure is herein incorporated by reference.

BACKGROUND OF THE INVENTION

This invention relates to ambulance cots and in particularly, to a multi-level roll-in ambulance cot having a kickstand.

Ambulance cots typically comprise an essentially rectangular patient support frame with wheeled collapsible-leg assemblies enabling the stretcher to be stowed or loaded into the back of an ambulance. Examples of such prior art cots are disclosed in U.S. Pat. Nos. 4,097,941, 4,192,541, 4,767,148, 5,537,700, and 5,575,026. Although the prior art cots have been generally adequate for their intended purposes, they have not been satisfactory in all aspects.

Patients transported on an ambulance cot often need to be weighed as part of a medical check upon admittance to a hospital or other health care facility. Due to the size of the wheelbase of a cot and the size of platform scales generally found in clinics, hospitals, nursing homes, or rehabilitation centers, patients typically must either stand on the platform scale or be placed in a wheelchair in order to be weighed. For many of these individuals, standing or being transferred from the ambulance cot to a wheelchair is difficult, or impossible, to accomplish. Consequently, forgoing the weighing of such patients has become commonplace, which can degrade the quality of medical care provided to them.

SUMMARY OF THE INVENTION

It is against the above background that the present invention provides a kickstand to a cot construction. Cot constructions of the present invention include a cot frame supported by a stable wheeled undercarriage, which permits the cot frame to be raised and lowered to a plurality of positions of use. The kickstand is provided to the wheeled undercarriage, and may be situated in at least raised and lowered positions. The kickstand when placed in the lowered position lifts one of the two pairs of wheels provided to the wheeled undercarriage into the air. By lifting one of the two pairs of wheels, the kickstand reduces the footprint of the wheeled undercarriage upon a support surface such that a patient situated upon the cot may be conveniently weighed on a platform scale.

In one embodiment of the present invention, an ambulance cot comprising a kickstand having a lowered position and a raised position is disclosed.

In another embodiment of the present invention, an ambulance cot for transporting a patient is disclosed. The cot comprises a cot frame for support the patient thereon, a wheeled undercarriage supporting the cot frame, and a kickstand mounted to the undercarriage.

In still another embodiment of the present invention, a method of weighing a patient on a platform scale is disclosed. The method comprises carrying the patient upon an ambulance cot having a kickstand and a pair of wheels, and supporting the ambulance cot on the platform scale with the pair of wheels and the kickstand.

These and other features and advantages of the invention will be more fully understood from the following description of some embodiments of the invention taken together with the accompanying drawings. It is noted that the scope of the claims is defined by the recitations therein, and not by the specific discussion of features and advantages set forth in the present description.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention.

DETAILED DESCRIPTION

Figure 1:
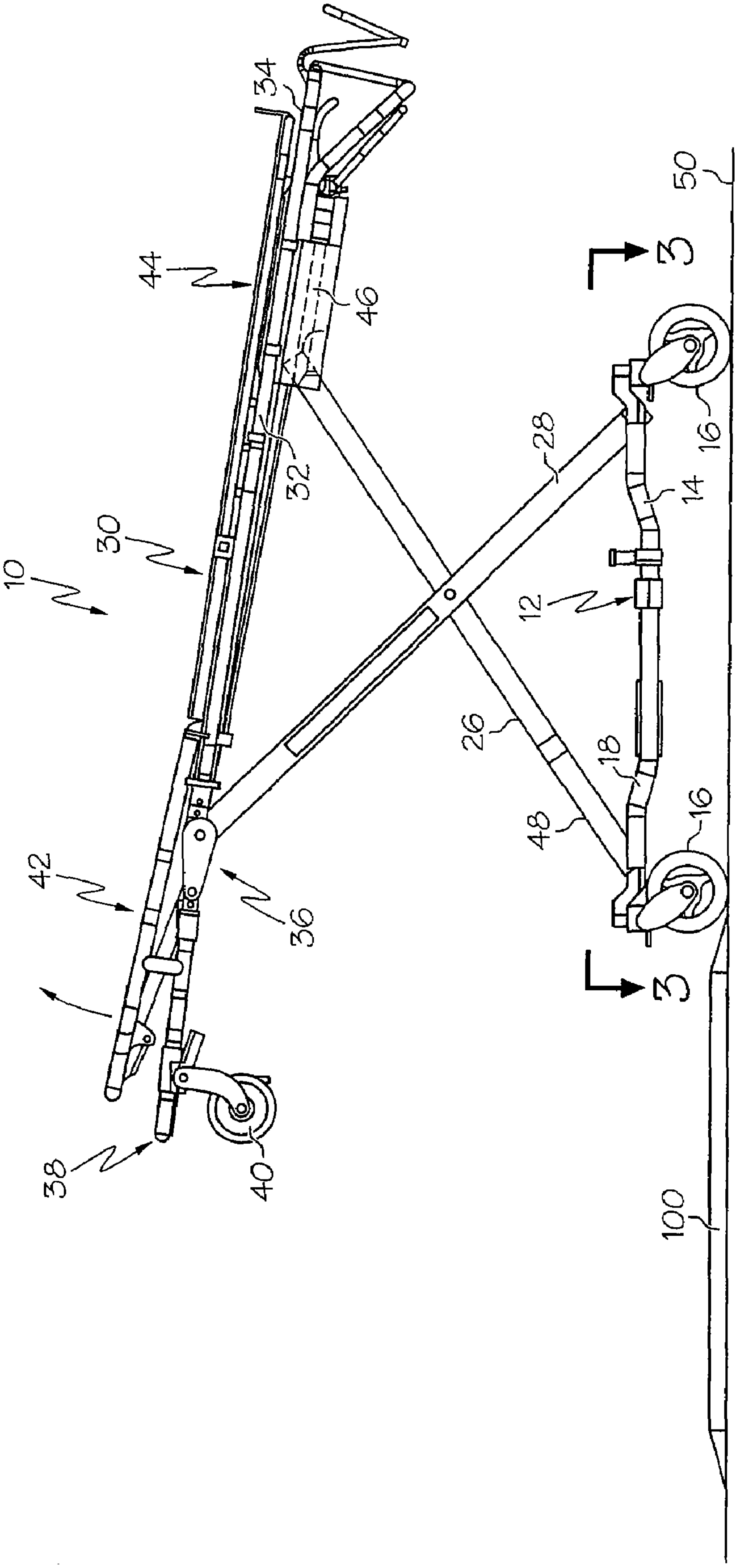
FIG. 1 is a side view of a cot structure embodiment of the invention having a kickstand situated in a raised position and also illustrating a conventional platform scale.
Figure 2:
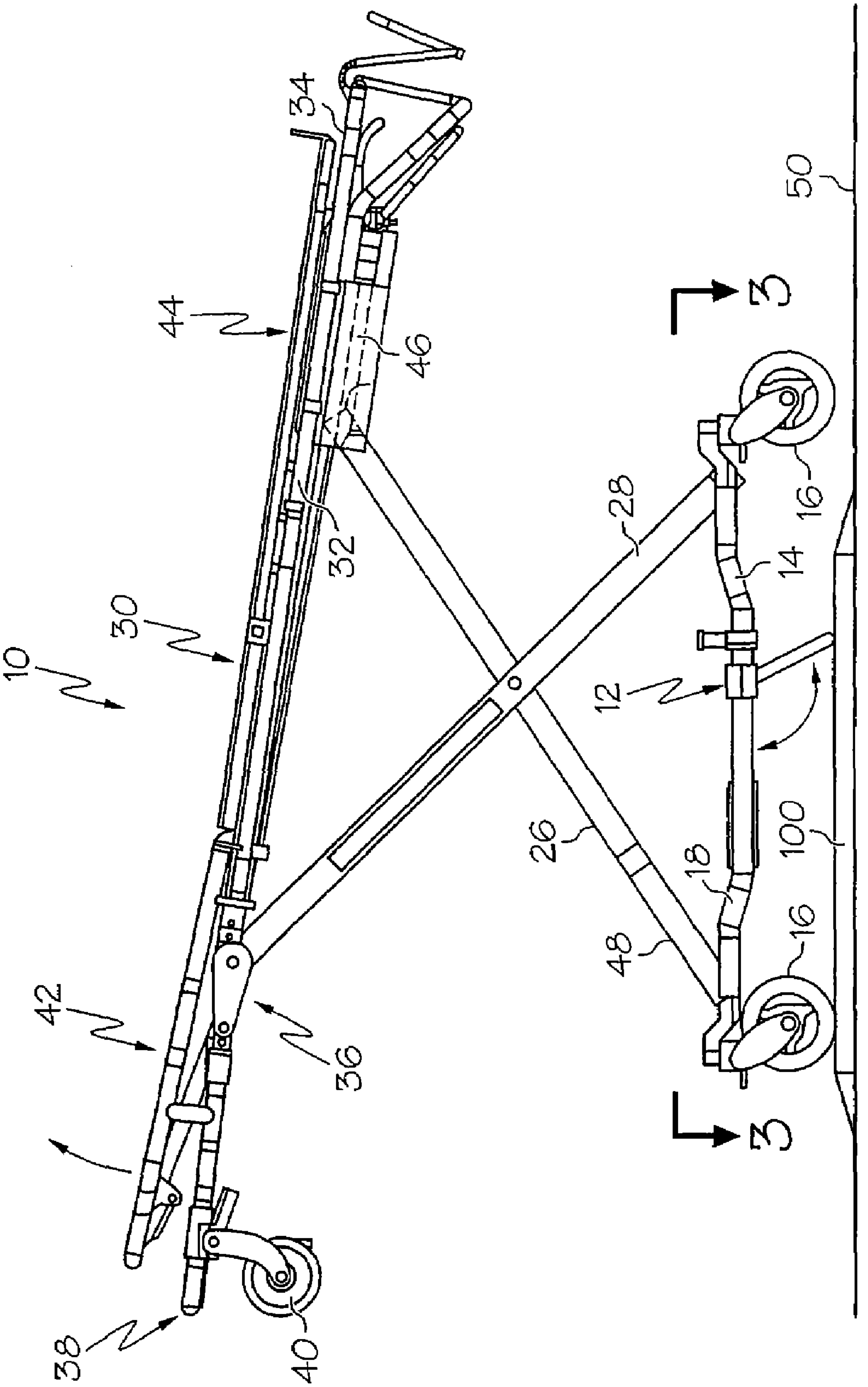
FIG. 2 is a side view of a cot structure embodiment of the invention having a kickstand situated in a lowered position and also illustrating the cot situated upon the conventional platform scale of FIG. 1 according to the present invention.
Figure 3:
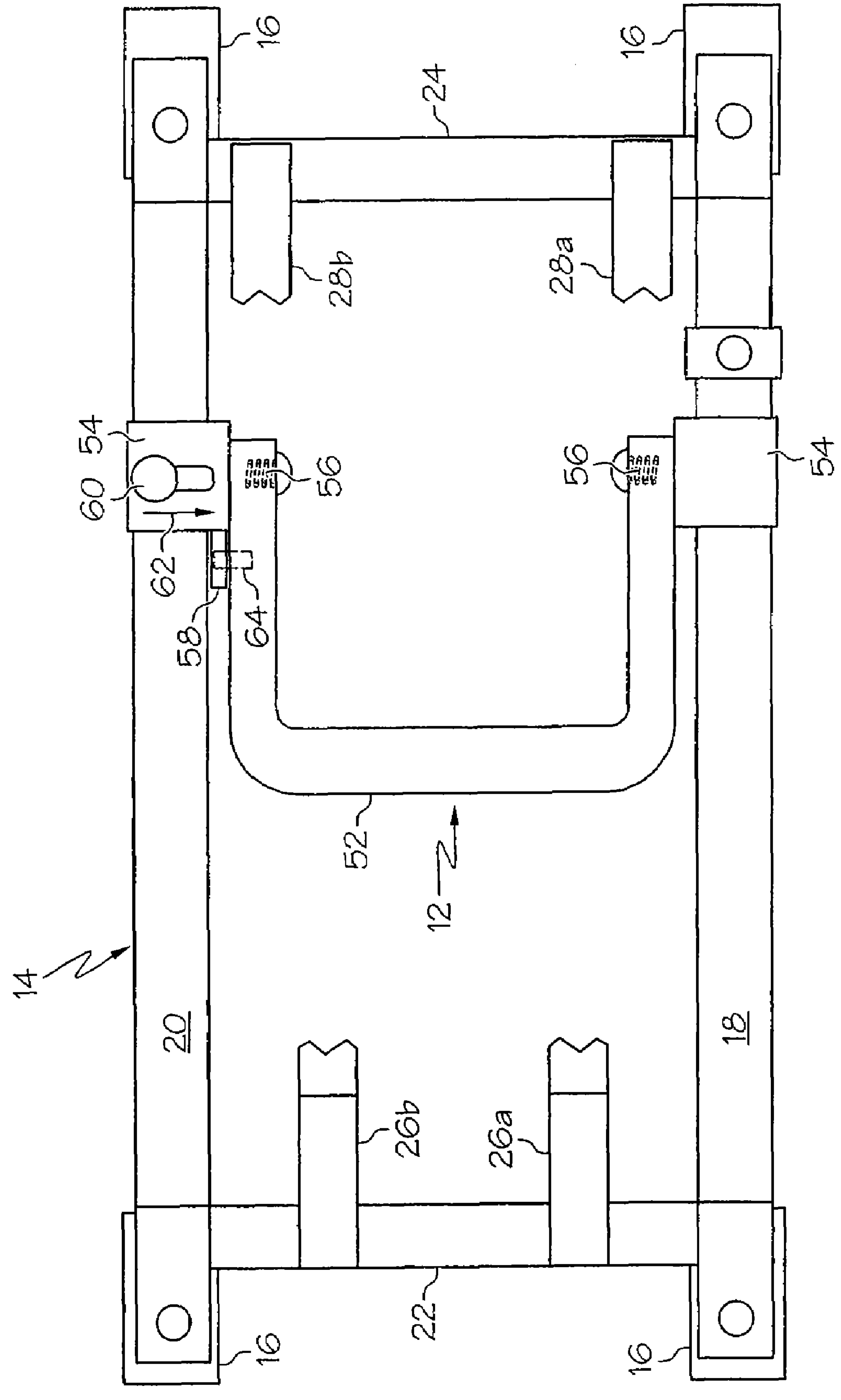
FIGS. 3 and 3A are top sectioned view of a portion of the embodiment of FIG. 1 taken along section line 3-3, and showing the kickstand in a raised position.
Figure 3A:
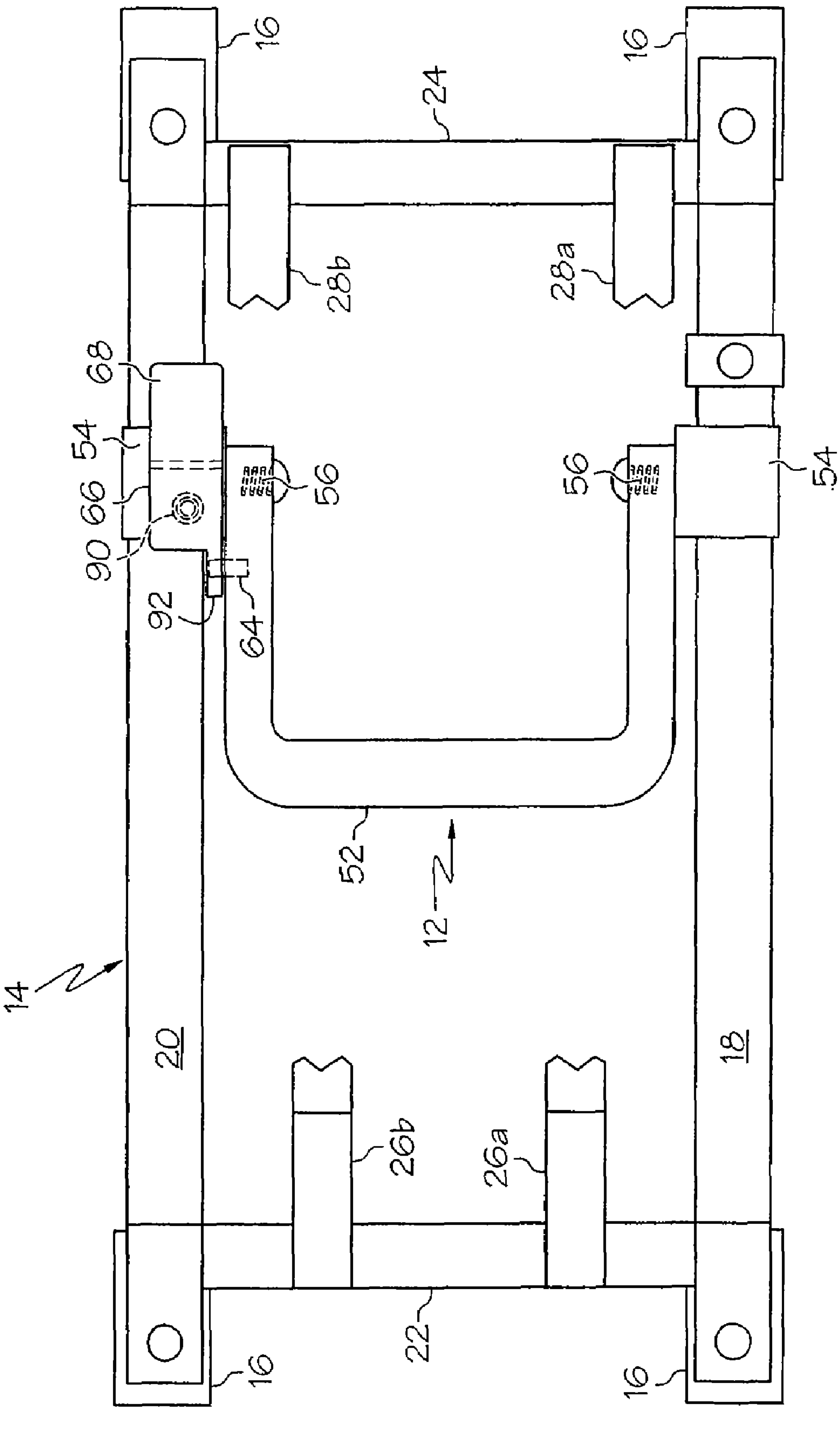

Referring to FIGS. 1, 2, 3, and 3A, illustrated is a cot structure embodiment, generally indicated by symbol 10, having a kickstand, generally indicated by symbol 12, according to the present invention. The cot 10 has a rectangular undercarriage 14 mounting pairs of swivel caster wheels 16 at its opposite ends. The undercarriage 14 includes opposing side frame members 18 and 20, which are interconnected by transverse frame members 22 and 24, which are best seen in FIG. 3.

Extending upwardly from the undercarriage 14 are pairs of cross forming frame members 26*a*, 28*a* and 26*b*, 28*b*, which serve to interconnect the undercarriage 14 with a cot frame, generally indicated by symbol 30. Cot frame 30 includes opposing tubular side frame members 32 (same on side not shown) interconnected at the foot or trailing end by a transverse tubular end member 34. At their leading or forward ends, the side frames 32 each terminate at a respective hinge pivot 36 (same on side not shown). Supported by the pair of hinge pivots 36 is a drop frame 38 rotatably coupled thereto.

The drop frame 38 is releasable engaged by the pair of hinge pivots 36, which also limits the range of motion of drop frame 38. In particular, the drop frame 38 is movable from the extended position, as seen in FIGS. 1 and 2, to a collapsed position placing the drop frame below the cot frame 30. The drop frame 38 is provided with a pair of loading wheels 40.

It will be understood that the basic cot frame 30 may be provided with various adjustable features, such as folding side arms (not shown), a multiple-position backrest, indicated generally at 42, and an adjustable leg section for placing the patient in a shock position, indicated generally at 44, all of which are conventional features. Other conventional features also may be provided in other embodiments.

The undercarriage 14 is configured to selectively secure the cot frame 30 in a number of elevational positions relative to the undercarriage 14. The lowermost ends of the cross-forming frame members 26*a*, 26*b* and 28*a*, 28*b* are pivotally connected to transverse frame member 22 and 24, respectively. At their uppermost ends, the cross-forming frame members 26*a* and 26*b* are pivotally connected to the cot frame 30, and the cross-forming frame members 28*a* and 28*b* are connected slidably and pivotably to the cot frame 30. The cot frame 30 is height adjusted by releasing a locking bar (not shown) thereby permitting the cross-forming frame members 28*a* and 28*b* to move within slots 46. At the same time, extensible sections 48 (same on side not shown) telescope within the lowermost ends of cross-forming members 26*a* and 26*b*. As the cot 10 is repositioned, the sets of cross-forming frame members 26*a*, 26*b*, and 28*a*, 28*b* will elevate or lower as desired the cot frame 30 relative to the undercarriage 14.

As mentioned above in the background section of the invention, patients transported on an ambulance cot often need to be weighed as part of a medical check upon admittance to a hospital or other help care facility. A platform scale 100 generally found in clinics, hospitals, nursing homes, or rehabilitation centers, used to weigh patients either standing or situated in a wheelchair thereon is shown.

The cot 10 at the undercarriage provides the kickstand 12 which may be moved between a raised position (FIG. 1) and a lowered position (FIG. 2). The kickstand 12 when placed in the lowered position lifts one of the two pairs of wheels 16 provided to the wheeled undercarriage 14 into the air as illustrated by FIG. 2. By lifting one of the two pairs of wheels 16, the kickstand 12 reduces the footprint of the wheeled undercarriage 14 upon a surface 50. In this manner, by reducing the footprint of the wheeled undercarriage 14 by lowering the kickstand 12, a patient situated upon the cot 10 may be conveniently weighed on the platform scale 100. It is to be appreciated that the distance between one of the pair of wheels 16 and the kickstand 12 (i.e., the footprint) is such that the total weight of the cot and patient may be placed upon the platform scale 100 for weighing, such as illustrated by FIG. 2. Accordingly, the patient conveniently does not have to be removed from the cot 10 in order to be weighed.

As shown by FIG. 3, the kickstand 12 includes a u-shaped support bar 52 that is rotatably mounted between the side frame members 18 and 20, via a pair of kickstand mounts 54. Each kickstand mount 54 is removably secured to its respective side frame member 18 and 20. In one embodiment, the u-shaped support bar 52 is spring-biased, via at least one spring 56, to the dropped position. In this manner, the u-spaced support bar 52 is returned to the raised position from the lowered position against the force of the spring(s) 56.

In still another embodiment, the kickstand 12 includes a catch 58 and a release 60. Moving the release 60 from a locked position (as illustrated) to a release position, which is indicated by moving the release 60 in the direction of arrow 62, clears the catch 58 with an engagement with a pin 64 on the u-shaped bar 52, thereby causing the u-shaped bar 52 under the force of one of the springs 56 to lower to the surface supporting the cot 10. The kickstand 12 is then fully deployed by continuing to rotate the cot 10 over the u-shaped support bar 52 until being stopped in the fully lowered positioned illustrated by FIG. 2. In the lowered position, the release 58 also will secured the u-shaped bar 52 from movement. In another embodiment illustrated by FIG. 3A, the catch and release may be an integral unit, such as a spring biased lever 66. In such an embodiment, when a release portion 68 is pivoted downwards against spring bias from a spring 90, a catch portion 92 is released from its engagement with pin 64. As the movement and positioning of the u-shaped bar 52 is the same as described above in the previous embodiment no further discussion is provided.

Upon a desire to raise the kickstand 12, such as after a patient has been weighed on the platform scale 100, the release 60 is again moved from the locked position to the release position, and the cot 10 is either raised or rotated over the u-shaped support bar 52. Once the u-shaped support bar 52 is clear of the surface supporting the cot 10, it will return to the raised position, which is illustrated by FIGS. 1 and 3, under force of the at least one of the springs 56. In other embodiments, the u-shaped support bar 52 is manually placed in either the raised or lowered position, or both.

Accordingly, it is to be appreciated that a method of weighing a patient on a platform scale with the present invention is also disclosed. The method comprises carrying the patient upon the ambulance cot 10, and moving the cot into position upon the platform scale 100. Once so positioned, the kickstand 12 is placed in the lowered position. In this manner, the cot 10 is supported upon the platform scale 100 with one of the pairs of wheels and the kickstand 12, such as illustrated by FIG. 2. After recording the combined weight of the cot and patient and the patient has been transferred to another support surface, such as an operating table, bed, wheelchair, etc., the cot without the patient is then weighed (if unknown) in the same fashion as before on the platform scale. Accordingly, subtracting the weight of the ambulance cot from the combined weight of the ambulance cot and patient provides the weight of the patient.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is therefore, claimed in any of its forms or modifications within the proper scope of the appended claims appropriately interpreted in accordance with the doctrine of equivalents. Any modification of the present invention that comes within the spirit and scope of the following claims should be considered part of the present invention.

What is claimed is:

1. A method of weighing a patient on a platform scale, said method comprising:

carrying the patient upon an ambulance cot having first and second pairs of wheels and a kickstand having a lowered position and a raised position, wherein said kickstand in the lowered position lifts only the first pair of wheels of the ambulance cot in the air; and supporting the ambulance cot on the platform scale with the second pair of wheels and said kickstand.

2. The method of claim 1 further comprising: supporting the ambulance cot without the patient on the platform scale with the second pair of wheels and the kickstand, and subtracting the weight of the ambulance cot from the combined weight of the ambulance cot and patient to provide the weight of the patient.

3. The method of claim 1 further comprising: releasable mounting the kickstand to an undercarriage of the ambulance cot.

4. The method of claim 1 further comprising: providing the kickstand with a u-shaped support bar.

5. The method of claim 1 further comprising: providing the kickstand with a spring biased support bar.

6. The method of claim 1 further comprising: providing the kickstand with a release, and using the release to enable the kickstand to be moved from at least one of the raised and lowered positions.

7. The method of claim 1 further comprising: providing the kickstand with a release and a support bar spring biased to the raised position, wherein the release is movable from a locked position to a release position; moving the release to release position; and moving the kickstand from the raised position to the lowered position.

8. The method of claim 1 further comprising: providing the kickstand with a release movable from a locked position to a release position, a support bar which may be positioned in the raised position and the lowered position, and a pair of springs acting on the support bar; moving the release to the release position; and moving the support bar from the raised position to the lowered position under the force of at least one of the springs.

9. The method of claim 1 further comprising: providing the kickstand with a release movable from a locked position to a release position, a support bar which may be positioned in the raised position and the lowered position, and a pair of springs acting on the support bar; moving the release to the release position; and moving the support bar from either the raised position or the lowered position under the force of at least one of the springs.

10. A method of weighing a patient on a platform scale, said method comprising:

carrying the patient upon an ambulance cot having:

first and second pairs of wheels, a kickstand movable between a lowered position and a raised position, wherein the kickstand in the lowered position lifts only the first pair of wheels of the ambulance cot in the air, and a release movable from a locked position to a release position, wherein in the release position the kickstand is movable from the raised position to the lower position;

positioning the second pair of wheels on the platform scale;

moving the release to the release position;

moving the kickstand from the raised position to the lowered position to support the ambulance cot on the platform scale with only the second pair of wheels and the kickstand; and subtracting the weight of the ambulance cot from the combined weight of the ambulance cot and patient to provide the weight of the patient.

* * * * *